United States Patent

Oshima

[11] Patent Number: 6,081,704
[45] Date of Patent: Jun. 27, 2000

[54] MOBILE RADIO COMMUNICATION DEVICE

[75] Inventor: Hiroyuki Oshima, Yokohama, Japan

[73] Assignee: NEC Corporation, Tokyo, Japan

[21] Appl. No.: 08/956,680

[22] Filed: Oct. 23, 1997

[30] Foreign Application Priority Data

Oct. 23, 1996 [JP] Japan .................................. 8-280746

[51] Int. Cl.⁷ ............................................. H04M 1/66
[52] U.S. Cl. ......................... 455/410; 455/411; 455/419
[58] Field of Search .............................. 455/410, 411, 455/419, 420, 564, 408, 405, 406, 418; 379/373

[56] References Cited

U.S. PATENT DOCUMENTS

| | | | |
|---|---|---|---|
| 5,046,082 | 9/1991 | Zicker et al. | 455/419 |
| 5,109,403 | 4/1992 | Sutphin | 455/419 |
| 5,228,080 | 7/1993 | Nutter et al. | 379/373 |
| 5,276,729 | 1/1994 | Higuchi et al. | 455/564 |
| 5,600,708 | 2/1997 | Meche et al. | 455/411 |
| 5,819,171 | 10/1998 | Hoogerwerf et al. | 455/410 |
| 5,862,472 | 1/1999 | Park | 455/410 |

FOREIGN PATENT DOCUMENTS

| | | |
|---|---|---|
| 0 476 390 A2 | 3/1992 | European Pat. Off. . |
| 4-95421 | 3/1992 | Japan . |
| 4-104625 | 4/1992 | Japan . |
| 4-373348 | 12/1992 | Japan . |
| 6-125305 | 5/1994 | Japan . |
| 6-188829 | 7/1994 | Japan . |
| 6-326659 | 11/1994 | Japan . |
| 7-087559 | 3/1995 | Japan . |
| 7-193865 | 7/1995 | Japan . |
| 8-140142 | 5/1996 | Japan . |
| 2 304 001 A | 3/1997 | United Kingdom . |

*Primary Examiner*—Dwayne D. Bost
*Assistant Examiner*—Quochien B. Vuong
*Attorney, Agent, or Firm*—Scully, Scott, Murphy & Presser

[57] ABSTRACT

It is an object of the present invention to inhibit the use of a portable telephone that is lost or stolen and to smoothly recover it.

According to the present invention, a mobile radio communication device for exchanging information with another communication device via a radio communication channel, comprises: automatic response means for automatically providing a predetermined response upon receipt of a signal from another communication device; means for receiving a remote operation signal that is input following the response, and for establishing an arbitrary number as a transmission destination telephone number that is used thereinafter; and memory reading inhibition means for inhibiting the reading of a memory.

4 Claims, 4 Drawing Sheets

MOBILE RADIO COMMUNICATION DEVICE

BACKGROUND OF THE INVENTION

1. Field of the Invention

The present invention relates to the inhibition of the use of a mobile radio communication device when it is lost or stolen and to the smooth recovery of the mobile radio communication device.

2. Related Arts

Recently, many demands are being placed on mobile radio communication devices, which serve as "whenever, wherever and with whomever" communication means, and in consonance with technical developments, there has been a rapid increase in the degree of freedom of use afforded by their portability and in the number of them that are in use. An example arrangement of such a mobile radio communication device is described in Japanese Unexamined Patent Publication No. Hei 8-140142, and an explanation will be given for a PHS (Personal Handy Phone System) portable mobile station while referring to a block diagram in FIG. 1. In FIG. 1, reference numeral 41 denotes a power source controller; 42, a voice processor; 43, a TDMA controller; 44, a radio controller; 45, a radio unit; 46, a battery; 47, a main controller; 48, a memory; 49, a display; 50, a key operation unit; 51, a transmitter/receiver, which uses a loudspeaker and a microphone; 52, an antenna; 53, a transmission controller; and 54, a timer.

The main controller 47 is connected to the individual sections 41 to 46, sections 48 to 51, and sections 53 and 54, excepting only section 52, the antenna, and controls the entire mobile station in consonance with a control program stored in the memory 48. In consonance with the operational state of the mobile station, the power source controller 41 precisely turns on and off the power supplied to the battery 46 or to the individual sections. For example, since no sound is required while dialing using the key operation unit 50, the supply of power to the power source system, such as the voice processor 42, is halted.

The voice processor 42 processes voice signals received at the antenna 52 and outputs speech through the loudspeaker of the transmitter/receiver 51. In addition, the voice processor 42 processes voice input through the microphone of the transmitter/receiver 51 and outputs it from the antenna 52, and generates an audible alarm via the transmitter/receiver 51.

The TDMA controller 43 performs a time-sharing process for a TDMA system using a signal that is received from the voice processor 42 or the radio controller 44. The radio controller 44 controls radio functions, and the radio unit 45 converts transmission signals into radio frequencies, and also converts reception signals into intermediate frequencies.

The display 49 employs a liquid crystal display process to display telephone numbers, transmitted by the key operation unit 50, and guidance that is consonant with key operation commands and alarms. The transmission regulator 53 controls transmissions in consonance with the setup of a secret ID number using the key operation unit 50, or controls transmissions in consonance with a transmission control start time and a transmission control end time that are input using the key operation unit 50. The timer 54 transmits the transmission control start time and end time to the transmission controller 53.

When the thus arranged mobile station is powered on, the mobile station measures the strength of the electric field of signals that are transmitted by surrounding base stations, and then acquires control channel data from the nearest base station and enters the standby state in consonance with the control channel data that is acquired. When a transmission request, such as the input of a telephone number, is issued by the key operation unit 50, the mobile station performs predetermined procedures for transmission to the base station. When transmissions by a mobile station that has been lost or stolen are to be controlled to prevent its unauthorized use, a method exists for controlling transmissions using a secret ID number, or for controlling transmissions within an arbitrary time period. According to this method, a secret ID number is input using the key operation unit 50, with transmission being inhibited as long as the secret ID number is not input or when the transmission regulator 53 does not recognize a secret ID number that is input; or the control start time and end time are input by using the key operation unit 50, and in consonance with the input, the transmission controller 53 inhibits transmissions within a time period indicated by the timer 54. When the condition for inhibiting automatic transmissions is time period control, it is difficult for multiple home users to set time periods for the inhibition of transmissions by a mobile station. In addition, when a transmission must be made while transmission inhibition is in effect, another operation is required to permit transmissions and communication activities and to reset the transmission control time. As a result, such an operation is complicated and resetting of a transmission control time period may be forgotten.

To eliminate this shortcoming, a transmission controller is provided for a mobile station. When a user inputs a specific code to place a mobile station in a transmission control mode, code recognition means identifies the specific code that is input as code that is used to establish a transmission control mode and the controller places the mobile station in a transmission control mode that corresponds to the specific code. When a user inputs a telephone number that is not to be targeted by transmission control, the telephone number that is input is recorded by telephone number setting means. Then, when the user inputs a period of time during which transmission control is to be effective for transmissions to telephone numbers other than the one mentioned above, the input time is set by time setting means. Following this, if a third party initiates a transmission to a telephone number other than the one set by the telephone number setting means, the transmitted telephone number comparison means detects this and determines that the telephone number entered for the transmission differs from that set by the telephone number setting means. As a result, the timer means begins to measure the elapsed communication time. When the elapsed time exceeds the time that is set by the time setting means, the transmission controller imposes transmission control and places the mobile station in the off-hook state.

An explanation will now be given for a means employed to search for a mobile station that has been lost. First, an audible alarm of the lost mobile station can be generated by calling the mobile telephone using a mobile telephone communication mode. A specific mobile station ID (inherent number) wait setting unit and a transmission control release failure recognition unit are provided for the transmission control. In the condition where the ID is set at the mobile station and transmission is restricted, the specific mobile station ID wait setting unit identifies a failure in the release of transmission control when an inadequate operation for the release of the inhibition of transmission is performed at predetermined times. When a failure is identified, the main controller 47 places the mobile station in a mobile station intercommunication wait state and reduces reception sensitivity to a predetermined level. Further, the main controller 47 generates an audible alarm emitted at maximum amplification by the loudspeaker. As part of the mobile station search performed by the thus arranged mobile station, an ID input by the key operation unit 50 is set; whether or not transmission is inhibited is determined; the input code recognition means determines whether code input by the key operation unit 50 is valid; the inhibition of transmissions is released when the code input is a secret ID number for the release of such transmissions; the main controller identifies the unauthorized use and places the mobile station in the mobile station inter-communication wait state when the count of invalid codes input reaches five or more; a variable ATT or AGC in the radio unit 5 is controlled to reduce reception sensitivity to a predetermined level; an audible alarm, a buzzing sound, generated at the loudspeaker is adjusted to the maximum amplification; and the searching mobile station approaches a mobile station to be searched for and reduces reception sensitivity to a range wherein an audible alarm, a buzzing sound, can be received, to enable the easy detection of the mobile station that is searched for. It should be noted in this explanation that the mobile station has a function for switching from a normal system for communication with a base station to an abnormal system for communication with a mobile station.

Not only such a search for a mobile radio communication device, but also dialing limit means that functions when a radio device is lost or stolen, and a display control method for giving a warning message are proposed in Japanese Unexamined Patent Publication No. Hei 4-272995.

However, according to the prior art, when a mobile radio communication device is misplaced, lost or stolen, its unauthorized use by a third party can not be prevented. Even when a mobile radio communication device is in the hands of a third party who is acting in good faith and a dialing limit has been set, there is no way by which the third party can identify the owner, and accordingly, it takes time for the device to be returned to the owner.

SUMMARY OF THE INVENTION

It is an object of the present invention to provide a mobile radio communication device, a search for which can be performed at an early stage and for which unauthorized use can be prevented, even when the mobile radio communication device is misplaced or lost somewhere, or is stolen.

According to the present invention, a mobile radio communication device for exchanging information with another communication device via a radio communication channel, comprises: automatic response means for automatically providing a predetermined response upon receipt of a signal from another communication device; means for receiving a remote operation signal that is input following the response, and for establishing an arbitrary number as a transmission destination telephone number that is used thereinafter; and memory reading inhibition means for inhibiting the reading of a memory.

In addition, according to the present invention, in a mobile radio communication device, the automatic response means, in response to a call, transmits a signal to the effect that an off-hook state is set. The remote operation signal is stored in a memory, and when the remote operation signal is received, the remote operation signal is compared with a remote operation signal in the memory controlled by a CPU. When the signals match, reading from the memory and control by the CPU are inhibited.

A mobile radio communication device, for exchanging information with another communication device via a mobile radio communication channel, includes automatic response means, for automatically transmitting a predetermined response when a signal is received from another communication device, whereby after a remote number from the other communication device is input following the response a subsequent key operation is regarded as invalid.

According to the present invention, a mobile radio communication device includes automatic response means, for transmitting a response upon the receipt of a call from another communication device, and memory reading inhibition means, for employing a remote operation signal that is input to inhibit reading from a memory. The leakage of personal information concerning the owner is prevented, an arbitrary number is thereinafter set as a transmission destination telephone number, and a specific display is provided at a transmission destination. Therefore, it is easy to communicate with a third party having a mobile radio communication device that is no longer in the hands of the owner, and to thus facilitate the early return of the mobile radio communication device to its owner.

DETAILED DESCRIPTION OF THE PREFERRED EMBODIMENTS

Figure 2:
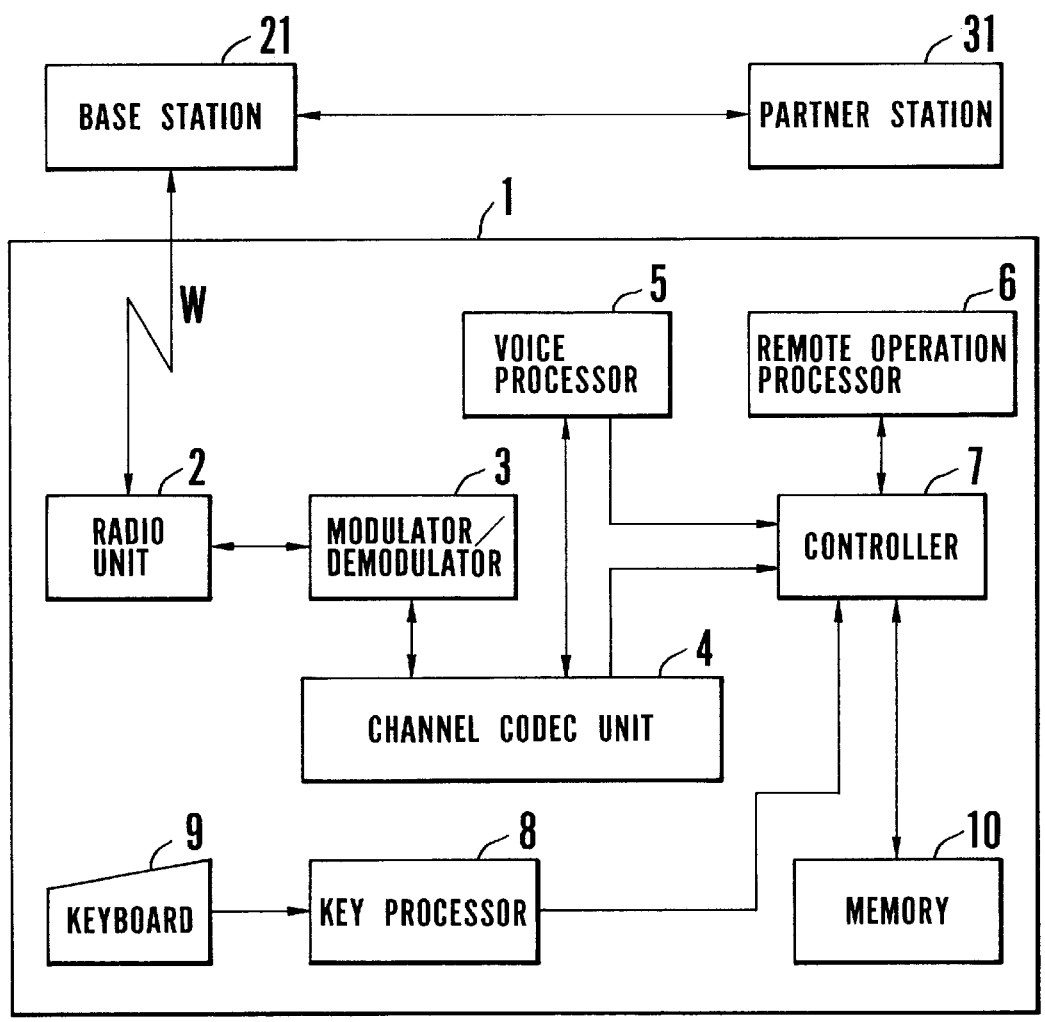
FIG. 2 is a block diagram illustrating the electrical circuit arrangement for a mobile radio communication device according to an embodiment of the present invention.

FIG. 2 is a block diagram illustrating the electrical circuit arrangement for a mobile radio communication device (hereinafter referred to as a mobile station) 1 according to a first embodiment of the present invention. The numbered blocks constituting the mobile station 1 will now be explained in ascending numerical reference order. A radio unit 2 exchanges signals with a relay base station (hereinafter referred to as a base station) via radio channel W.

A modulator/demodulator 3 demodulates a signal received from another communication device (hereinafter referred to as a partner station) 31, and modulates signals to be transmitted to the partner station 31. A channel codec unit 4 separates a demodulated signal into a voice signal and a control signal, or synthesizes a voice signal and a control signal that are to be modulated. A control signal is employed for a so-called pre-process and post-process for function identification and confirmation, which are performed before and after communication with the partner station 31. After the pre-process has been performed, the mobile station 1 is prepared for reception.

A voice processor 5, which serves as automatic response means, detects a received signal and transmits it to a remote operation processor 6 and a controller 7, and activates voice generation means (not shown), such as a voice synthesizer, to prepare a response message, or an audible error signal, and to transmit it to the partner station 31. The remote operation processor 6, which serves as signal identification means, compares a signal input after the response has been sent with a secret ID number that is defined in advance, and determines whether a subsequent signal should be accepted.

When the remote operation processor 6 determines that a subsequent signal should be accepted, it transmits a signal to that effect to the partner station 31, and thereafter receives a remote control signal from the partner station 31. When the acceptance of a subsequent signal is not authorized, the controller 7 terminates the connection.

The controller 7, which serves as means for fixing an arbitrary number as a transmission destination, is constituted by a microcomputer (not shown). A key processor 8 and a memory 10 are located near the controller 7. Key operation at a keyboard 9 having a 12-key arrangement is input to the controller 7 via the key processor 8. The memory 10 is constituted by a ROM in which are stored in advance the procedures for the operation of the mobile station 1, a voice program and character data, and a RAM in which are temporarily stored signal data transmitted by the partner station 31. Data reading and writing are performed between the memory 10 and the controller 7.

Figure 1:
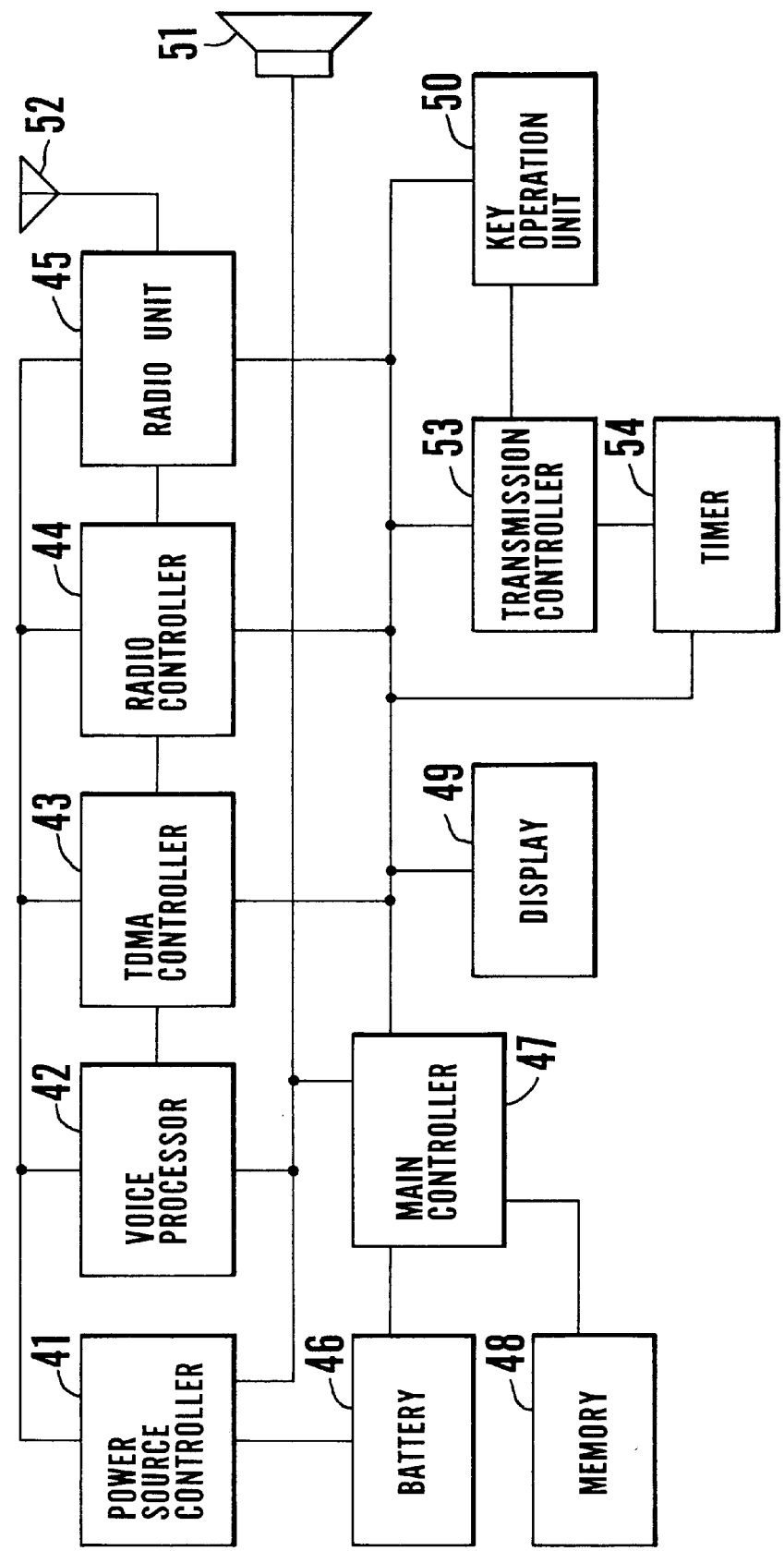
FIG. 1 is a block diagram illustrating the arrangement of a conventional mobile radio communication device.
Figure 3:
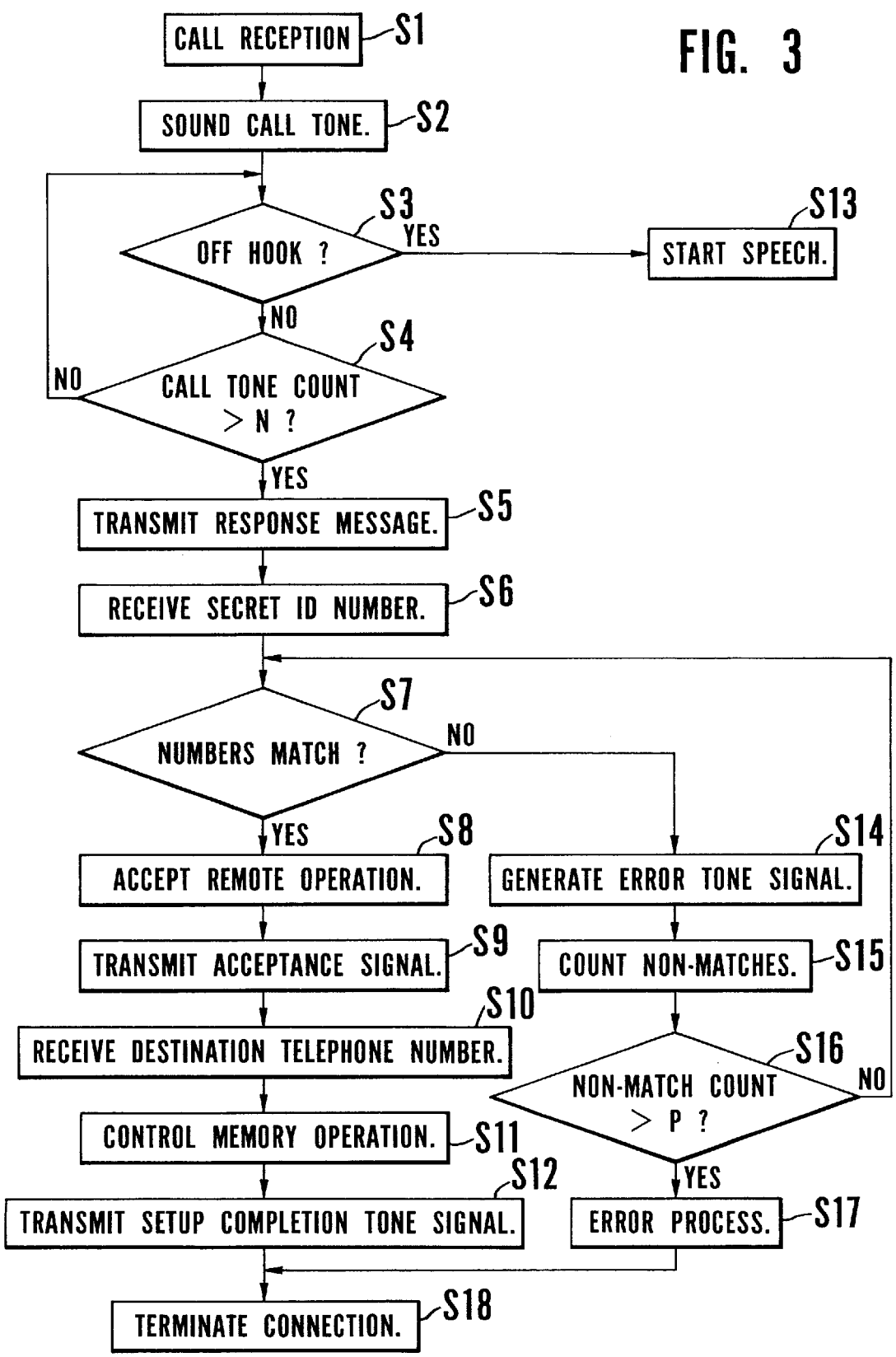
FIG. 3 is a flowchart for explaining a remote operation for locking the dialing of the mobile radio communication device in FIG. 2.

FIG. 3 is a flowchart showing an operation of the present invention for fixing an arbitrary number as a transmission destination telephone number for a mobile station. In the following explanation, the mobile station 1 is a telephone that has been lost, for example, and is no longer in the hands of its owner, the partner station 31 is another communication device, a telephone, operated by a user, and a remote operation signal from the partner station 31 is employed to fix an arbitrary number as the transmission destination telephone number for the mobile station 1. The same reference numerals used in FIG. 1 are used in FIG. 3, and the operation described by the flowchart will now be explained by also referring to FIG. 1.

First, at step S1, the owner of the mobile station 1 calls it by dialing the partner station 31. A call signal from the base station 21 is received by the radio unit 2 via the radio channel W, and is demodulated by the modulator/demodulator 3. The demodulated signal is separated by the channel codec unit 4 into a control signal and a voice signal, and the control signal is input to the controller 7. The control signal for the mobile station 1 is modulated by the modulator/demodulator 3, and the resultant signal is transmitted to the base station 21. The control signal is exchanged between the mobile station 1 and the base station 21, and the mobile station 1 is prepared for reception.

At step S2, the voice processor 5 drives a loudspeaker (not shown), and generates a call tone signal. A call tone signal may be generated by using a buzzer, or instead of using a loudspeaker, a vibrator may be driven and vibrated for a call. At step S3, a check is performed to determine whether or not the handset (not shown) of the mobile station 1 is off the hook (the handset has been lifted). When the handset is off the hook, program control moves to step S13 to set a normal communication state. When the handset has been lifted by a third party, the owner of the mobile station 1 speaks to the third party to relate his or her desire.

When, at step S3, the handset has not been lifted and is on the hook, program control moves to step S4. While the generation of call tone signals continues, the controller 7 counts the number of rings, and determines whether or not the number of rings has reached a predetermined number N. The predetermined number N can be set to an arbitrary number by the owner. In this embodiment, N=10. When the count N of rings equals the predetermined number, 10, program control advances to step S5, whereat an automatic response is transmitted from the mobile station 1 to the partner station 31. The controller 7 halts the generation of call tones the voice processor 5, and instead, the controller 7 reads predetermined voice data from the memory 10 and activates voice generation means, such as a voice synthesizer, to generate a response message for transmission to the partner station 31. The response message is, for example, an audio message for the notification of an absence. The response message is modulated by the modulator/demodulator 3 and the resultant message is transmitted via the base station 21 to the partner station 31. When the owner confirms the response message, in order to control the mobile station 1, by dialing, he or she transmits a secret ID number that was set in advance in the mobile station 1. The secret ID number, for example, consists of a four-digit number.

At step S6, the voice processor 5 detects the received numerical signal, and the controller 7 stores the detected numerical digits in the memory 10. At step S7, the number stored in the memory 10 is read and compared with the secret ID number that was set in advance. When the received number does not match the secret ID number, program control moves to step S14, whereat the controller 7 permits the voice processor 5 to generate an error time signal and transmits to the partner station 31 a signal to the effect that the secret ID number has not been matched. At step S15, the number by which an input number does not match the secret ID number is counted by a counter (not shown). At step S16, a check is performed to determine whether or not the count by which the received number does not match the secret ID number has reached a predetermined count P. In this embodiment, the predetermined count P is set to three. When the count exceeds the count P, at step S17, an error process is performed. The controller 7 clears the value stored in the memory 10, and program control moves to step S18, whereat the radio connection is broken.

If, at step S7, the input number matches the secret ID number, program control advances to step S8. The controller 7 instructs the remote operation processor 6 to accept a remote operation signal from the partner station 31, and places the mobile station 1 in a remote operation acceptance mode, i.e., in a mode whereby remote control of the mobile station 1 by the partner station 31 is enabled.

Following this, at step S9, a command to output a remote acceptance tone signal is issued to the voice processor 5, and a remote acceptance tone signal is transmitted. The owner of the mobile station 1, who has received the remote acceptance tone signal at the station partner 31, thereby understands that remote control of the mobile station 1 is enabled. Thereafter, the owner, transmits a transmission destination telephone number set signal in order to activate a function for setting an arbitrary number as a transmission destination telephone number of the mobile station 1. The transmission destination telephone number set signal is input by using "#" or "*," for example, and the transmission destination telephone number to be set is input sequentially.

At step S10, the voice processor 5 detects the transmission destination telephone number set signal and transmits the detection result to the remote operation processor 6. The remote operation processor 6 identifies the input signal as the transmission destination telephone number set signal, and signals the controller 7 of that effect. At step S11, the controller 7 stores the received transmission destination telephone number in the memory 10. At step S12, the controller 7 permits the voice processor 5 to transmit a destination telephone number set complete tone signal. The mobile station 1, for which the transmission destination telephone number has been set, inhibits transmissions to telephone numbers other than that the number that has been set, or disables a memory reading function, unless the secret ID number is input and the transmission destination telephone number setting is unlocked. In this manner, personal data held by the mobile station 1, which is not in the hands of the owner, is protected, and the unauthorized use by a third party is prevented. Further, since the transmission destination telephone number can be set as the owner desires, the owner can speak to a third party and request that the telephone be returned. As a result, a forceful effect is provided.

In the embodiment shown in FIG. 2, since the transmission destination telephone number setting function of a mobile station 1 is so employed that by using another telephone its transmission destination telephone number can be set to an arbitrary number, the unauthorized use of the mobile station by a third party can be prevented, and the owner can speak to the third party and request that the mobile station be returned.

In the above embodiment, communication is enabled only when, at step S3, the handset of the mobile station 1 that is misplaced, lost or stolen is off the hook, and the previous input of the secret ID number is effective only when the handset has not been lifted. Instead of this, a control program can be stored in the memory 10 in advance that, when the mobile station 1 is powered on and is prepared for reception and the telephone number of the mobile station and its secret ID number are sequentially input using the partner station 31, steps S1 and S2 are performed and program control jumps to step S5. Then, steps S5 through S18 are performed by the controller 7, so that a mobile station that has been misplaced, lost or stolen can be found early and a message can be transmitted to the person who possesses the mobile station 1.

Figure 4:
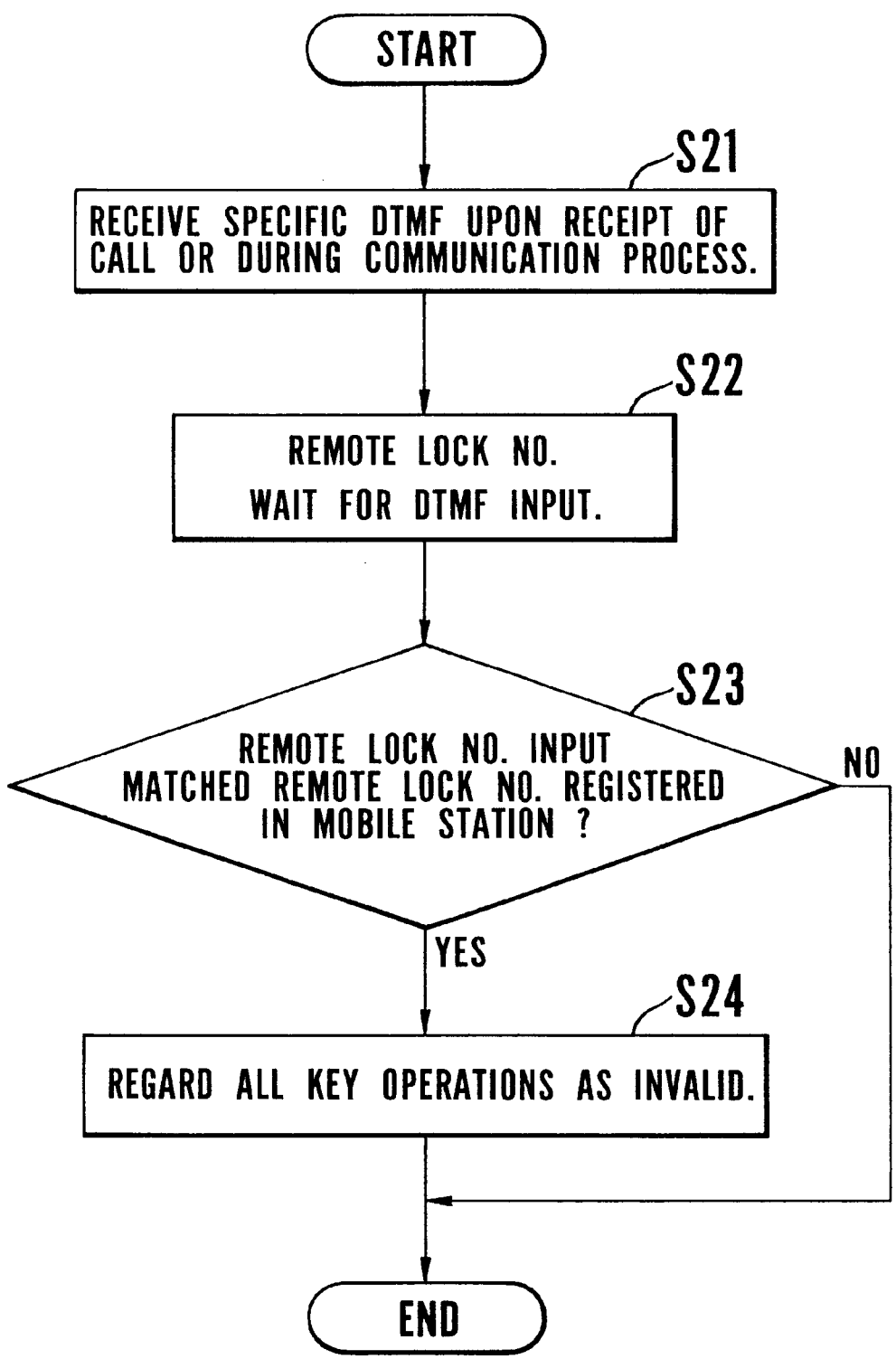
FIG. 4 is a flowchart for explaining another remote operation for the locking dialing of the mobile radio communication device in FIG. 2.

A second embodiment of the present invention will now be described while referring to FIG. 4. The arrangement of a mobile station in this instance is the same as that in FIG. 2.

At the reception of a call or during the communication process of a mobile station, such as a pocket bell that has been misplaced, lost or stolen, receives a specific DTMF (Dual Tone Multi-Frequency) (step S21). Upon the receipt of the DTMF, a controller 7 is placed on standby for the input of a remote lock number that has been set in advance (step S22). When the remote lock number is input, it is compared with the remote lock number that has been set in advance (step S23). When the lock numbers match, all key operations at the mobile station are inhibited, and a specific tone signal is generated and released through a loudspeaker (step S24). When the lock numbers do not match, the mobile station continues to perform a normal communication function. In this manner, when a mobile station that has been misplaced, lost or stolen is being used by a third party and the owner of the mobile station inputs, by using another mobile station or a fixed telephone, a call number for his mobile station and a remote lock number, key operations at the mobile station can be rendered invalid via a base station, so long as the mobile station is within the zone of control of the base station. As a result, the unauthorized use of the mobile station can be prevented. Particularly if the remote lock number has been set as the secret ID number, the mobile station can be easily searched for, the probability that the mobile station will be returned by a person who has stolen it is increased, and attractiveness of theft can be reduced.

As is described above, according to the present invention, the mobile radio communication device comprises automatic response means for automatically providing an audio response upon receipt of a signal from another communication device; signal identification means for employing the contents of a signal received following the transmission of the response to determine whether a subsequent signal should be accepted; transmission destination telephone number fixing means for employing, after signal identification has been established, a sequentially received remote operation signal to set an arbitrary number as its transmission destination telephone number; and means for inhibiting operations relative to a memory. When a mobile radio communication device is misplaced, lost or stolen and is no longer in the hands of an owner, the remotely controlled setting of an arbitrary number as a transmission destination telephone number can be effected by using another communication device. As a result, the unauthorized use of the mobile station by a third party can be prevented, and operations relative to the memory can be inhibited so that the leakage of personal information can be prevented.

According to the present invention, since the owner can set an arbitrary transmission destination telephone number, he or she can directly contact a third party, thereby providing a forceful effect.

In addition, the mobile radio communication device of the present invention responds to a call from another communication device by using automatic response means, and employs a received remote operation signal to inhibit the reading of data from its own memory. Since the memory reading inhibition means is included in the mobile radio communication device, the leakage of information concerning the owner can be prevented, an arbitrary number can therein-after be set as the transmission destination telephone number, and a specified display can be provided at the contact destination. Thus, an owner can easily contact a third party who has a mobile radio communication device that belongs to the owner, and can encourage the third party to quickly return the mobile radio communication device.

What is claimed is:

1. A mobile radio communication device, for exchanging information with another communication device via a radio communication channel, comprising:

automatic response means for automatically providing a predetermined response in accordance with a preset ID number upon receipt of a signal from said another communication device;

means for receiving a remote operation signal from said another communication device that is input following said response, and for establishing an arbitrary number as a transmission destination telephone number that is used thereinafter; and memory reading inhibition means for inhibiting the reading of a memory of said mobile radio communication device.

2. The mobile radio communication device according to claim 1, wherein said automatic response means, in response to a call, transmits a signal to the effect that an off-hook state is set; wherein said remote operation signal is received and stored in a memory and compared with a remote operation signal prestored in said memory controlled by a CPU; and wherein, when said signals match, reading from said memory and control by said CPU are inhibited.

3. A mobile radio communication device, for exchanging information with another communication device via a mobile radio communication channel, comprising:

automatic response means, for automatically transmitting a predetermined response from said mobile communication device in accordance with a preset ID number when a call signal is received from said another communication device;

and means for receiving a remote operation signal from said another communication device that is input following said response, and for establishing an arbitrary number as a transmission destination telephone number that is used thereinafter; whereby after said destination telephone number received from said another communication device is input following said response a subsequent key operation which inputs a telephone number other than said destination telephone number is regarded as invalid.

4. The mobile radio communication device according to claim 3, wherein said automatic response means, in response to said call signal, transmits a signal to the effect that an off-hook state is set; wherein data corresponding to said remote number is prestored in a memory in said mobile communication device, and comparison means compares data accompanying said remote number that is received with said data prestored in said memory under a control by a CPU; and wherein, when said data accompanying said remote number matches said data prestored in said memory, said CPU inhibits detection of said key operation.

* * * * *

UNITED STATES PATENT AND TRADEMARK OFFICE
CERTIFICATE OF CORRECTION

PATENT NO. : 6,081,704
DATED : June 27, 2000
INVENTOR(S) : Hiroyuki Oshima

It is certified that error appears in the above-identified patent and that said Letters Patent are hereby corrected as shown below:

On The Title Page, [56] References Cited, FOREIGN PATENT DOCUMENTS:

Insert --5 177589  3/1995   Japan--

Signed and Sealed this

Eighth Day of May, 2001

Attest:

NICHOLAS P. GODICI

*Attesting Officer*    Acting Director of the United States Patent and Trademark Office